United States Patent
Rapeanu

(10) Patent No.: US 10,876,710 B2
(45) Date of Patent: Dec. 29, 2020

(54) REFLECTOR AND LED ASSEMBLY FOR EMERGENCY LIGHTING HEAD

(71) Applicant: Thomas & Betts International LLC, Wilmington, DE (US)

(72) Inventor: Radu Cornel Rapeanu, Quebec (CA)

(73) Assignee: Thomas & Betts International LLC, Wilmington, DE (US)

( * ) Notice: Subject to any disclaimer, the term of this patent is extended or adjusted under 35 U.S.C. 154(b) by 210 days.

(21) Appl. No.: 16/158,903

(22) Filed: Oct. 12, 2018

(65) Prior Publication Data

US 2019/0041033 A1  Feb. 7, 2019

Related U.S. Application Data

(63) Continuation of application No. PCT/US2017/027129, filed on Apr. 12, 2017.
(Continued)

(51) Int. Cl.

| F21V 7/00 | (2006.01) |
|---|---|
| F21V 7/09 | (2006.01) |
| F21S 9/02 | (2006.01) |
| F21V 7/06 | (2006.01) |
| F21V 17/00 | (2006.01) |
| G02B 19/00 | (2006.01) |

(Continued)

(52) U.S. Cl.
CPC ............ *F21V 7/09* (2013.01); *F21S 9/022* (2013.01); *F21V 7/0083* (2013.01); *F21V 7/041* (2013.01); *F21V 7/06* (2013.01); *F21V 17/005* (2013.01); *G02B 19/0023* (2013.01); *G02B 19/0061* (2013.01); *F21Y 2105/10* (2016.08); *F21Y 2115/10* (2016.08)

(58) Field of Classification Search
CPC . F21V 7/09; F21V 7/06; F21V 7/0083; F21V 7/061; F21V 17/005; G02B 19/0061; G02B 19/0023; F21S 9/022; F21Y 2105/10; F21Y 2115/10
USPC ........................................................ 362/348
See application file for complete search history.

(56) References Cited

U.S. PATENT DOCUMENTS 6,644,841 B2  11/2003  Martineau
7,066,608 B2   6/2006  Davis et al.
(Continued)

FOREIGN PATENT DOCUMENTS

CN   201190936 Y   5/2008
FR    2732657 A1   4/1995

OTHER PUBLICATIONS

Search Report and Written Opinion, PCT Appl. No. PCT/US17/27129, dated Jul. 7, 2017, 8 pages.

*Primary Examiner* — Ali Alavi
(74) *Attorney, Agent, or Firm* — Taft Stettinius & Hollister LLP; J. Bruce Schelkopf

(57) ABSTRACT

An emergency lighting head including an LED light surface and a reflector, wherein the reflector has a main body reflector portion and a crown reflector portion attached to the main body portion. The main body reflector portion has an inner reflective surface symmetrical about a central optical axis. The reflective surface has a first end for receiving the LED light surface and a second end opposite the first end. The crown reflector portion is attached to the second end of the main body reflector portion and has an inner reflective surface tilted inwardly from the second end of the main body reflector portion toward the central optical axis.

16 Claims, 10 Drawing Sheets

Related U.S. Application Data

(60) Provisional application No. 62/321,837, filed on Apr. 13, 2016.

(51) Int. Cl.
*F21V 7/04* (2006.01)
*F21Y 115/10* (2016.01)
*F21Y 105/10* (2016.01)

(56) References Cited

U.S. PATENT DOCUMENTS

| | | |
|---|---|---|
| 7,276,841 B2 | 10/2007 | Kelly |
| 7,497,601 B2 | 3/2009 | Uke |
| 7,670,038 B2 | 3/2010 | Schug et al. |
| D625,880 S | 10/2010 | Leung et al. |
| 8,360,605 B2 | 1/2013 | Venhaus |
| 8,430,523 B1 | 4/2013 | Smith |
| 8,523,404 B2 | 9/2013 | Markytan et al. |
| 2003/0189832 A1 | 10/2003 | Rizkin et al. |
| 2004/0119668 A1* | 6/2004 | Homma ............ H01L 33/54 345/82 |
| 2005/0185409 A1 | 8/2005 | Mayer |
| 2009/0231856 A1* | 9/2009 | Householder ........ F21V 14/04 362/304 |
| 2009/0231858 A1* | 9/2009 | Yamazaki ........... G02B 27/095 362/331 |
| 2010/0195330 A1* | 8/2010 | Schaefer ............ F21V 7/09 362/237 |
| 2012/0281418 A1* | 11/2012 | Eckert ............ F21V 7/0083 362/306 |
| 2016/0084475 A1* | 3/2016 | Fujii ............ F21V 7/04 362/294 |

* cited by examiner

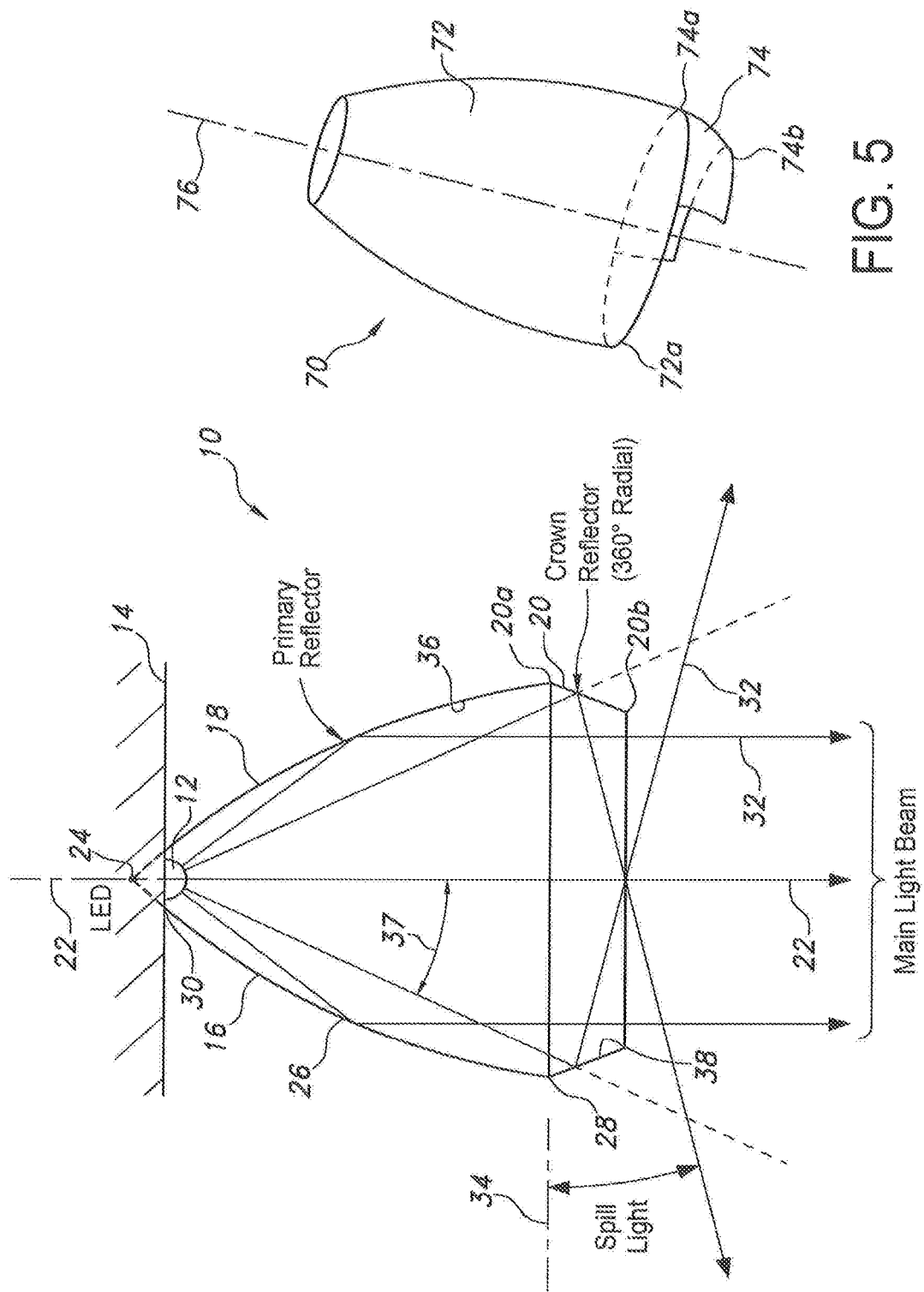

REFLECTOR AND LED ASSEMBLY FOR EMERGENCY LIGHTING HEAD

CROSS-REFERENCE TO RELATED APPLICATIONS

This application claims priority from U.S. provisional application Ser. No. 62/321,837, filed on Apr. 13, 2016, the specification of which is incorporated herein in its entirety for all purposes.

TECHNICAL FIELD

The present invention relates generally to lighting devices and more particularly to an emergency lighting assembly having a two-piece reflector for directing light in a desired pattern.

BACKGROUND

Light-emitting diodes (LEDs) have become a common alternative to incandescent filament bulbs used in emergency lighting due to lighting performance and efficacy (lumen/watt), color rendering and operational life. For the same luminous flux, LED emergency lights consume far less electrical power. Consequently, they require less battery backup capacity, smaller equipment size and lower costs.

However, a main challenge in designing LED emergency lights is to substitute high-power incandescent lamps (e.g., 50 W) with LED lights and integrated reflector so that the LED lights project a similar light distribution in the same space as popular types of conventional incandescent lamps, such as sealed-beam or MR16 lamps.

There are several models of LED lamp assemblies aimed to substitute sealed-beam and MR16 incandescent lamps. These known lamp assemblies typically use one or several LED lamps soldered on a printed circuit board (PCB) and further utilize optical components such as lenses, reflectors or a combination of both. However, the power consumption and luminous flux of conventional LED lamp assembly heads are limited to 3-6 W and 200-600 lumens. To date, there is a real challenge to design and manufacture LED luminaire head assemblies for emergency lighting that exceed these ranges.

Accordingly, it would be desirable to provide an LED lamp assembly with an original reflector to obtain an LED emergency lighting head that overcomes this limitation.

SUMMARY

In one aspect of the present invention, an emergency lighting head including an LED light surface and a reflector is provided, wherein the reflector has a main body reflector portion and a crown reflector portion attached to the main body portion. The main body reflector portion has an inner reflective surface symmetrical about a central optical axis. The reflective surface has a first end for receiving the LED light surface and a second end opposite the first end. The crown reflector portion is attached to the second end of the main body reflector portion and has an inner reflective surface tilted inwardly from the second end of the main body reflector portion toward the central optical axis.

The reflective surface of the main body reflector portion preferably has a parabolic shape defined by a vertex disposed on the central optical axis and the LED light source is positioned adjacent the vertex.

The crown reflector portion may extend 360° around the second end of the main body reflector portion or the crown reflector portion may extend only partially around the second end of the main body portion. In either case, the second end of the main body portion preferably creates a beam angle for light emitted from the LED light source of between 10-30 degrees with respect to the central optical axis and the crown reflector portion preferably reflects the light exiting the second end of the main body portion at an angle of 45-90 degrees with respect to the central optical axis.

In a preferred embodiment, a reflector for a multiple LED emergency lighting head is provided, wherein the reflector includes a main reflector unit having a plurality of wells formed therein and a crown reflector hub disposed between at least two adjacent wells of the main reflector unit. Each well has an inner reflective surface symmetrical about a central optical axis of the well. The inner reflective surface of each well has a first end for receiving an LED light source and a second end opposite the first end. The crown reflector hub has at least one inner reflective surface tilted inwardly from the second end of one of the at least two adjacent wells toward the central optical axis of the one of the at least two adjacent wells.

Preferably, the main reflector unit has four adjacent wells arranged in a square pattern and the crown reflector hub has an inner reflective surface for each of the four adjacent wells. Each of the inner reflective surfaces of the crown reflector hub preferably extends 90 degrees around the second end of a respective well and each of the inner reflective surfaces of the main reflector unit has a parabolic shape defined by a vertex disposed on the respective central optical axis adjacent the first end.

Features of the disclosure will become apparent from the following detailed description considered in conjunction with the accompanying drawings. It is to be understood, however, that the drawings are designed as an illustration only and not as a definition of the limits of this disclosure.

BRIEF DESCRIPTION OF THE DRAWINGS

FIG. 4 is a cross-sectional view of an LED reflector-based lamp emergency lighting head assembly formed in accordance with the present invention.

FIG. 5 is a perspective view of an alternative embodiment of the reflector shown in FIG. 4.

DETAILED DESCRIPTION OF PREFERRED EMBODIMENTS

Figure 1:
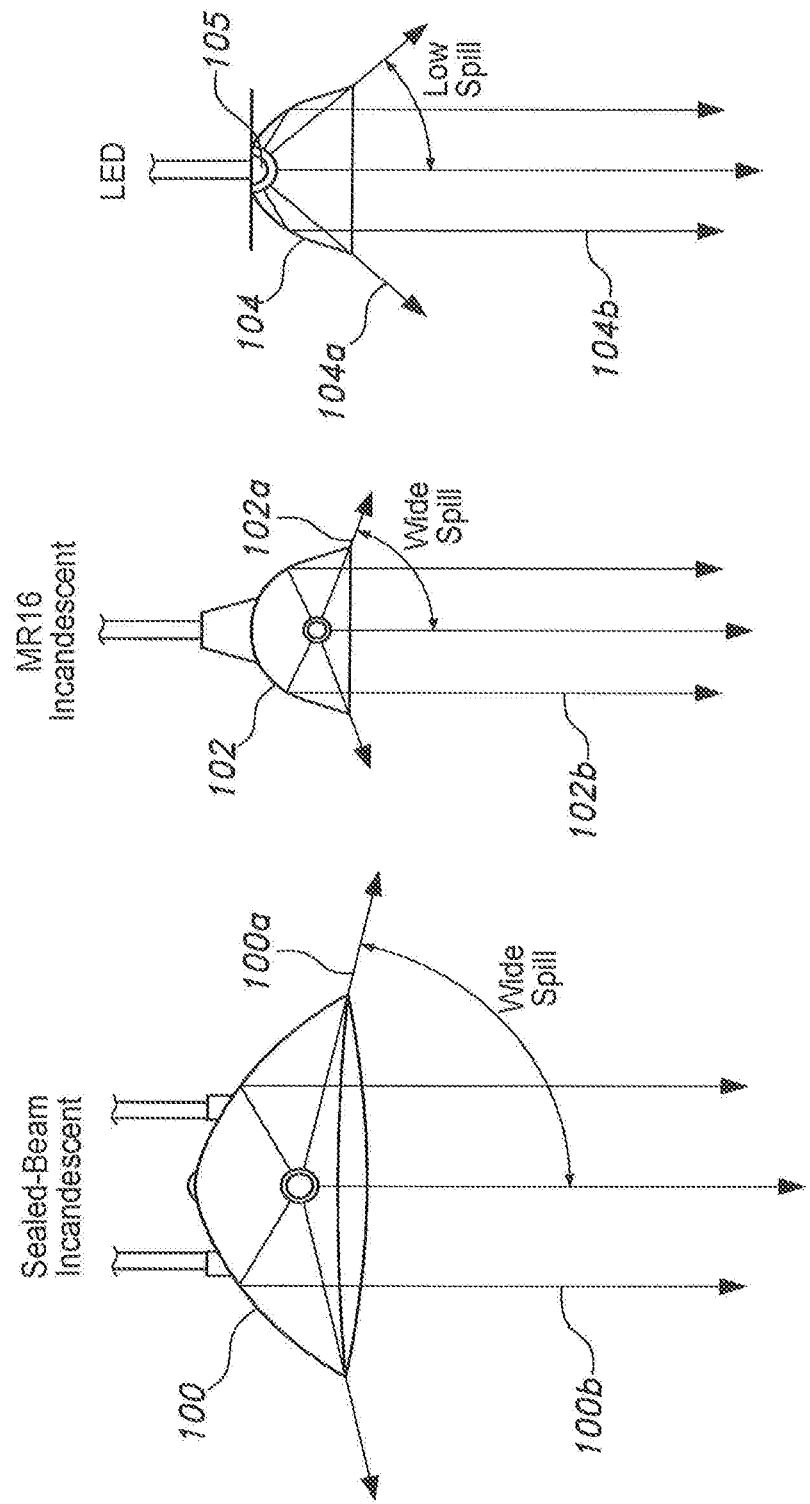
FIG. 1 shows schematic representations of the light spill of a conventional sealed beam incandescent lamp, a conventional MR16 incandescent lamp and a conventional LED lamp of the prior art.

As shown in FIG. 1, a sealed beam incandescent lamp assembly 100 of the prior art has a certain light spill 100a, beyond the concentrated light beam 100b, due to limitations in construction of the lamp and the reflector. This is the same with an MR16 incandescent lamp assembly 102 of the prior art.

In both cases, the concentrated light beam 100b, 102b is that portion of the light emitted by the lamp that is reflected by the reflector in a desired direction due to the design of the reflector. The light spill 100a, 100b is the remaining portion of the light that exits the reflector without being reflected. As schematically shown in FIG. 1, typical sealed beam incandescent lamp assemblies 100 and typical MR16 incandescent lamp assemblies 102 emit a relatively wide light spill 100a, 100b due to the fact that in such typical designs, the lamp filament, in each case, is relatively close to the lamp window.

In contrast, the design of a typical LED lamp assembly 104 of the prior art results in a low spill 104a with respect to the concentrated light beam 104b. This is because, in such LED lamp assemblies, the LED lamp 105 is installed at or closer to the base of the reflector, far from the window, which allows for a superior beam concentration and a reduced light spill.

Figure 2:
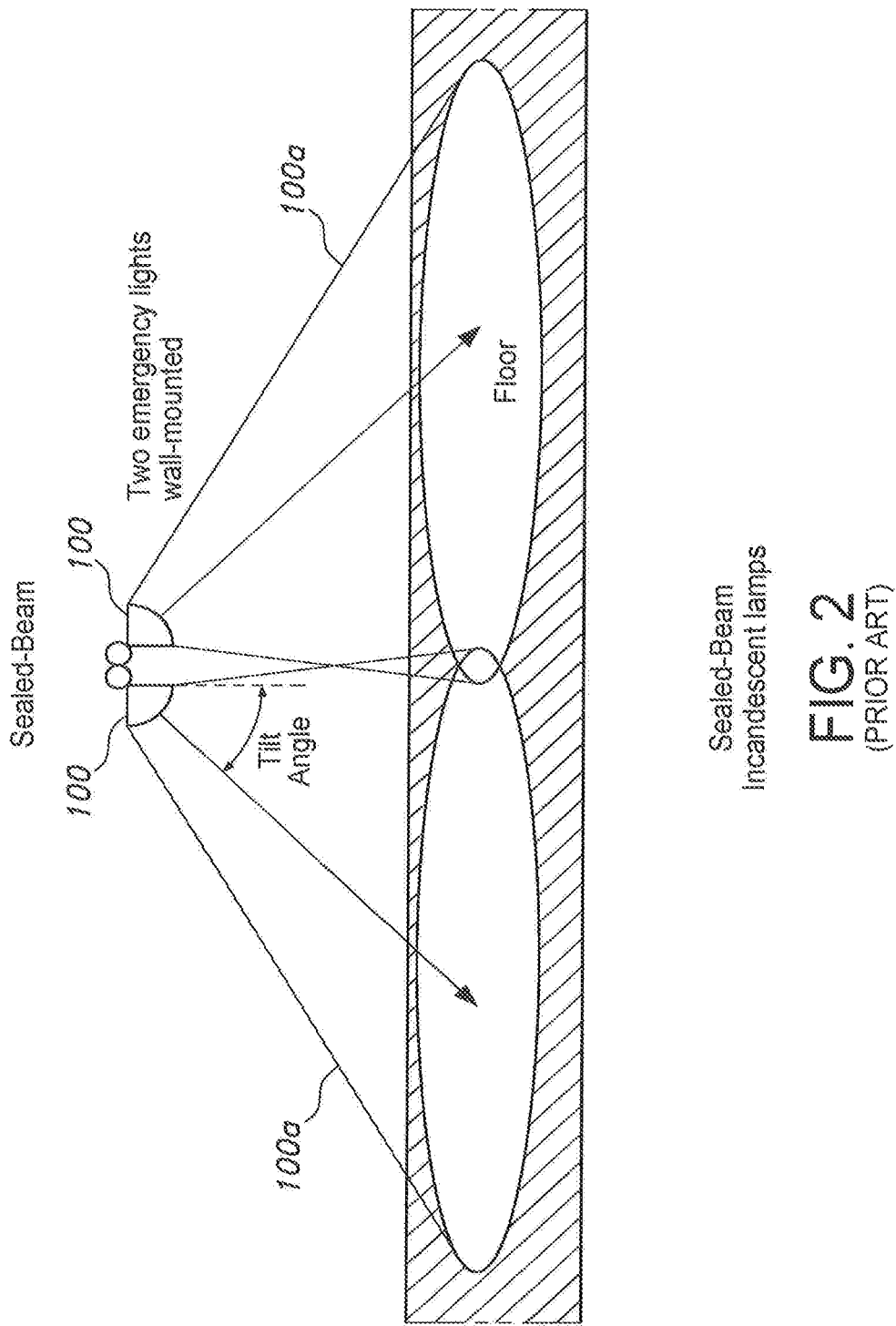
FIG. 2 is a schematic illustration of floor illumination with typical sealed-beam incandescent lamp emergency lighting heads of the prior art.

The apparent light waste that results from typical sealed beam incandescent lamp assemblies 100 and typical MR16 incandescent lamp assemblies 102 is, however, very useful in emergency lighting applications. As shown, for example in FIG. 2, the wide light spill 100a of two sealed-beam incandescent lamp assemblies 100 mounted in tandem on a wall allows each lamp head to be tilted for a long light throw, while keeping a minimum illumination on the floor at the installation point.

Figure 3:
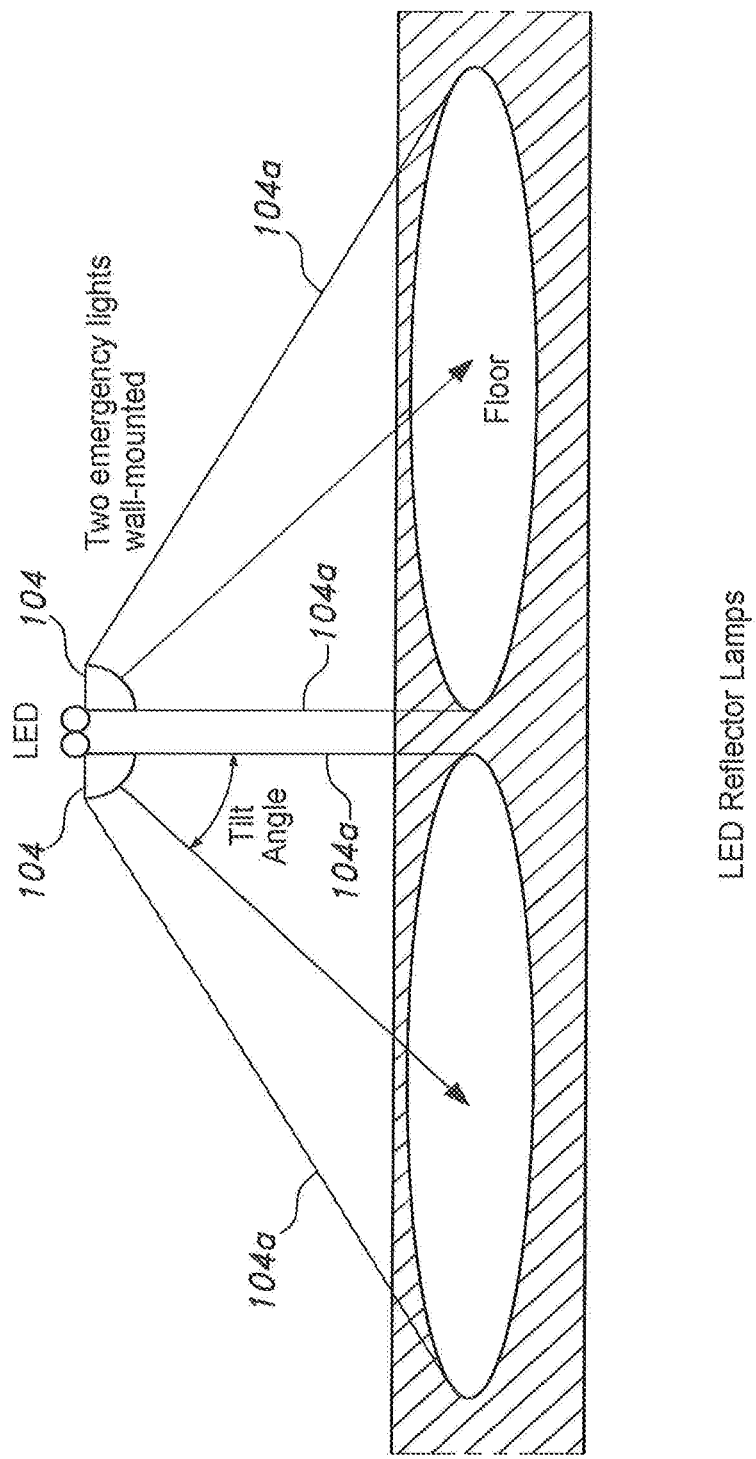
FIG. 3 is a schematic illustration of floor illumination with a typical LED reflector lamp emergency lighting head of the prior art.

In contrast, as shown in FIG. 3, the apparently efficient low light spill 104a that results from typical LED reflector-based lamp assemblies 104 of the prior art proves to be a limitation in emergency lighting applications. Specifically, the low light spill 104a from two wall-mounted LED lamp assemblies 104 typically causes insufficient illumination below the heads at the installation point.

Turning now to FIG. 4, the present invention solves this problem with a specially designed reflector that increases the light spill of a conventional LED lamp assembly. Specifically, FIG. 4 shows a cross-section of a basic embodiment of an emergency lighting head 10 formed in accordance with the present invention.

The lighting head 10 includes a conventional LED light source 12, which can be provided on a printed circuit board 14 with associated electronics (not shown) in a known manner. The lighting head 10 further includes a uniquely designed reflector 16 surrounding the LED light source 12.

The reflector 16 includes a main body reflector portion 18 and a crown reflector portion 20. The main body portion 18 has a generally parabolic shape symmetrical about a central optical axis 22. The parabolic shape of the main body portion 18 is defined by a vertex 24 disposed on the central optical axis 22. A symmetrically curved perimeter side wall 26 extends away from the vertex and defines an open end 28 opposite the vertex. The LED light source 12 is positioned within an opening 30 of the main body portion 18 adjacent the vertex 24, whereby the open end 28 of the main body portion opposite the LED light source forms an exit aperture for light, beams 32 emitted by the light source. The exit aperture formed by the open end 28 of the main body portion 18 further defines an exit aperture plane 34, which is preferably perpendicular to the central optical axis 22.

The curved perimeter side wall 26 of the main body portion 18 has an inner reflective surface 36 for reflecting and directing light emitted by the LED light source 12 out through the exit aperture formed by the open end 28. The parabolic shape and exit aperture of the main body reflector portion 18 preferably creates an overall beam angle 37 for the light emitted by the LED light source 12 and reflected off the inner reflective surface 36 of between 10-30 degrees with respect to the central optical axis 22.

In a preferred embodiment, the main body portion 18 is molded from a plastic material and a highly reflective layer or coating is applied to the inner surface of the plastic material to form the inner reflective surface 36. The highly reflective layer or coating can be a metal layer deposited on the inner surface of the plastic material in a known manner.

Attached to the open end 28 of the main body reflector portion 18 is a crown reflector portion 20, which effectively narrows the exit aperture formed by the open end of the main body portion. In its simplest form, the crown reflector portion 20 is in the shape of a 360 degree ring extending fully around the circumference of the open end 28 of the main body portion 18. The ring, in this case, is defined by a full conical section having its larger diameter end 20a attached to the open end 28 of the main body portion 18.

In other words, the crown reflector portion 20 is formed by a circular wall tapering inwardly toward the central optical axis 22 from the open end 28 of the main body portion 18. The tapering contour of the crown reflector portion 20 follows a specific parabolic curve beginning at its larger diameter end 20a and terminating at an open end 20b having a smaller diameter than the opposite open end 28 of the main body portion 18.

The crown reflector portion 20 also has an inner reflective surface 38 for reflecting and directing light emitted by the LED light source 12 out through an exit aperture formed by the open end 20b of the crown reflector portion 20 opposite the open end 28 of the main body portion 18. Here too, the crown reflector portion 20 is molded from a plastic material and a highly reflective layer or coating is applied to the inner surface of the plastic material to form the inner reflective surface 38. The highly reflective layer or coating can be a metal layer deposited on the inner surface of the plastic material in a known manner.

The crown reflector portion 20 is preferably fabricated separately from the main body portion 18 and is affixed to the main body portion in a conventional manner, such as by fasteners, an adhesive or some form of welding. It is conceivable, however, to form the main body portion 18 and the crown reflector portion 20 as a single contiguous unit.

In either case, the function of the crown reflector portion 20 is to deviate part of the direct light emitted from the LED source 12 in a wide sideways pattern to create a light distribution similar to the light spill of incandescent sealed-beam lamps. In other words, due to the inwardly tapered reflective surface 38 of the crown portion 20, light emitted by the LED light source will be reflected at a much greater angle with respect to the central optical axis 22. This results in the light being spread over a greater surface area as compared to the light spread without the crown reflector portion. This difference is illustrated by the dashed lines shown in FIG. 4.

In alternative embodiments of the present invention, the crown reflector may cover only part of the main reflector. For example, rather than having the crown reflector portion extend the full 360 degrees around the circumference of the open end of the main body portion, a partial crown portion can be provided, which extends only 180 or 90 degrees around the circumference of the open end.

Thus, FIG. 5 shows a reflector 70 including a main body portion 72 similar in most respects to the main body portion discussed above. However, the reflector 70 of FIG. 5 includes a crown portion 74 that does not extend fully around the circumference of the open end 76 of the main body portion 72. Instead, the crown portion 74 extends only 180 degrees on the open end 72a of the main body portion with respect to the central optical axis 76.

The partial crown portion 74 is similar in other respects to the full crown portion 20 described above. Specifically, the partial crown portion 74 is defined by a conical section having its larger diameter end 74a attached to the open end 72a of the main body portion 72. Also, the partial crown reflector portion 74 is formed by a wall tapering inwardly toward the central optical axis 78 from the open end 72a of the main body portion 72 to a smaller diameter end 74b. The tapering contour of the partial crown reflector portion 74 also preferably follows a specific parabolic curve.

Figure 6:
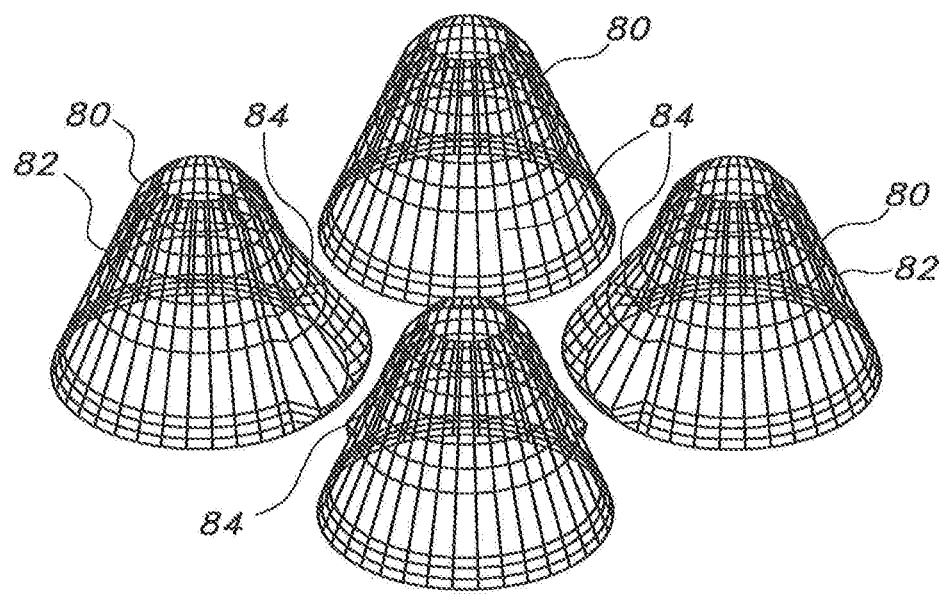
FIGS. 6 and 7 are graphical representations of the principle of the present invention applied to an LED assembly with four LED light sources.
Figure 7:
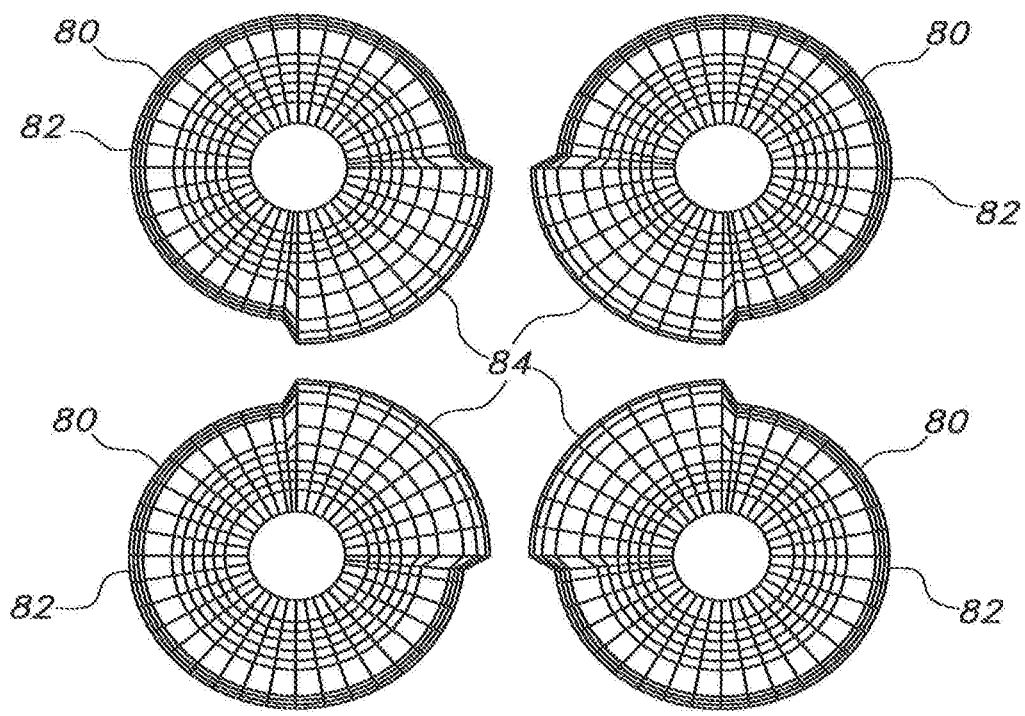

Such partial crown reflectors are particularly suited in lighting applications utilizing multiple. LED light sources. For example, this principle can be applied to an LED assembly with four LED light sources, (for cumulated light output), as graphically shown in FIGS. 6 and 7. In this case, each LED light source (not shown in FIGS. 6 and 7) has its own reflector cavity 80 including a main body reflector portion 82 and a crown reflector portion 84. However, in this case, each crown reflector portion 84 extends only 90 degrees around the open end of a respective body portion 82 so that the crown portion will deviate the light from its respective LED light source on a radial angle of 90 degrees. With the crown portions 84 oriented toward the center of the four reflector arrangement, the result is that the total light spill from the four LED sources has a complete 360-degree radial distribution.

Figure 8:
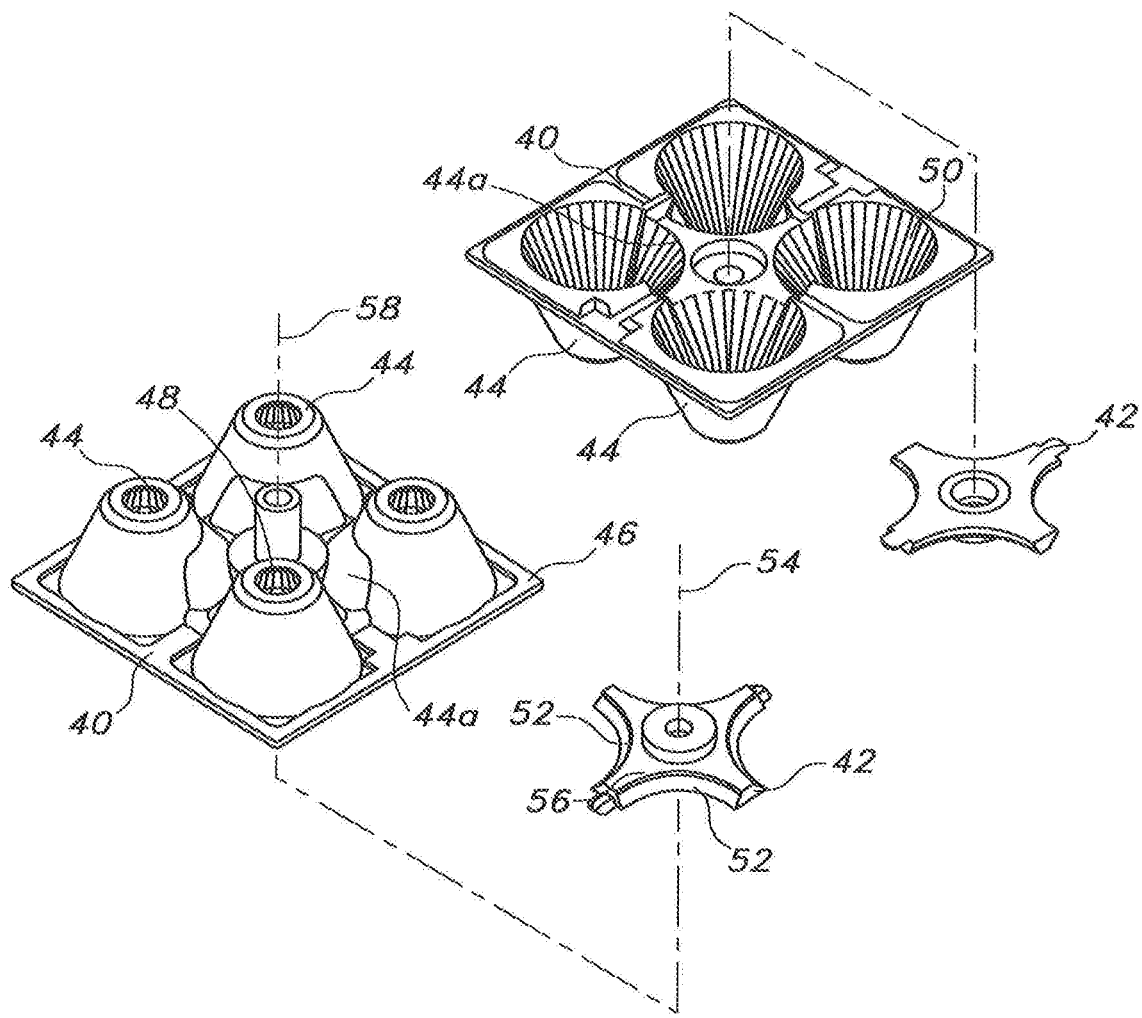
FIG. 8 shows top and bottom views of a main reflector unit and a crown reflector hub formed in accordance with the present invention.

This concept can be implemented in a practical manner with the LED lighting head assembly shown in FIGS. 8-12. FIG. 8 shows two views of a main reflector unit 40 and a crown reflector hub 42. The main reflector unit 40 is formed with four identical main body portions 44 arranged in a square pattern.

The main body portions 44 may take the form of parabolic shaped wells or cavities provided in a common frame 46. The main body portions 44 can be formed similar in most respects to the single main body portion 18, 82 described above. In this embodiment, each main body portion 44 has a generally parabolic shape symmetrical about a central optical axis and has an opening 48 adjacent its vertex for receiving an LED light source.

Figure 12:
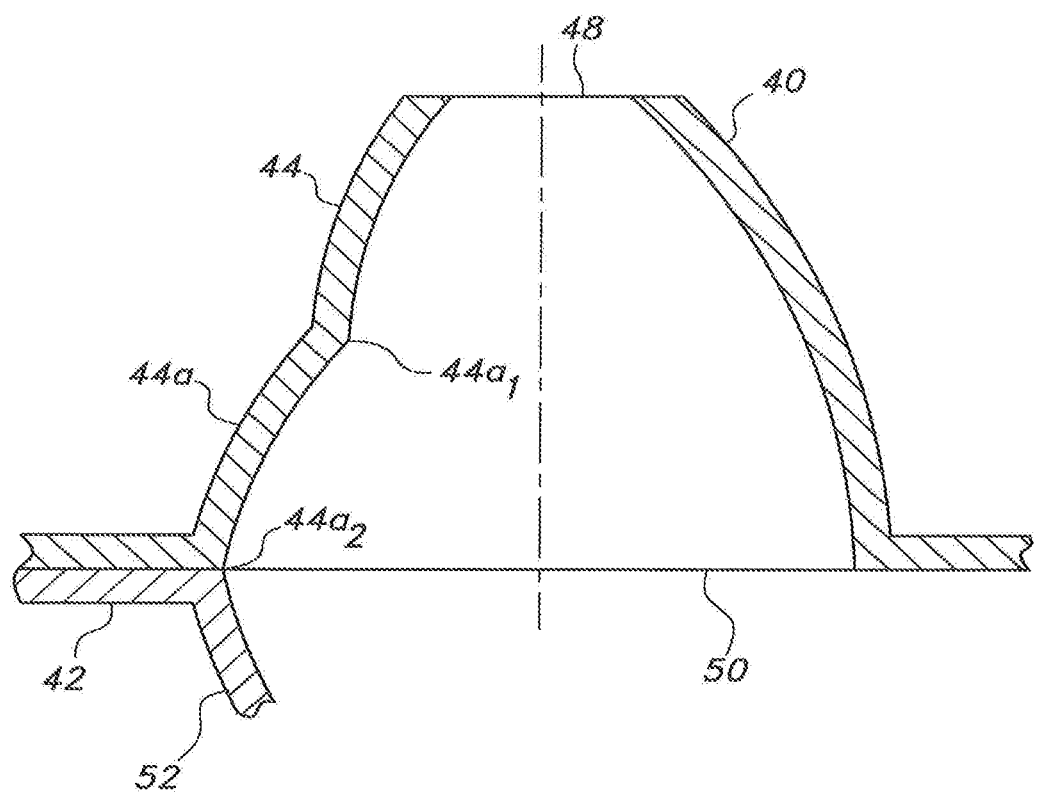
FIG. 12 is a cross-sectional view of one of the reflector cavities of the assembly shown in FIG. 11 taken along the line 12-12.

In an alternative embodiment, the main body portion 44 has a parabolic shape that is symmetrical in the area adjacent its vertex opening 48, but is formed with a bulged portion 44a at its open end 50 opposite the vertex end. As also shown in FIG. 12, the bulged portion 44a is a radially outwardly extending extension of the parabolic shape of the main body portion 44. More specifically, the bulged portion 44a is defined by a partial conical section having a smaller diameter end 44a1 and a larger diameter end 44a2 opposite the smaller diameter end. The smaller diameter end 44a1 is located at a point about half-way between the vertex opening 48 and the opposite open end 50 of the main body portion 44. The opposite larger diameter end 44a2 is located at the open end 50 of the main body portion. The tapering contour of the bulged portion 44a also preferably follows a specific parabolic curve between its smaller diameter end 44a1 and its larger diameter end 44a2.

Figure 9:
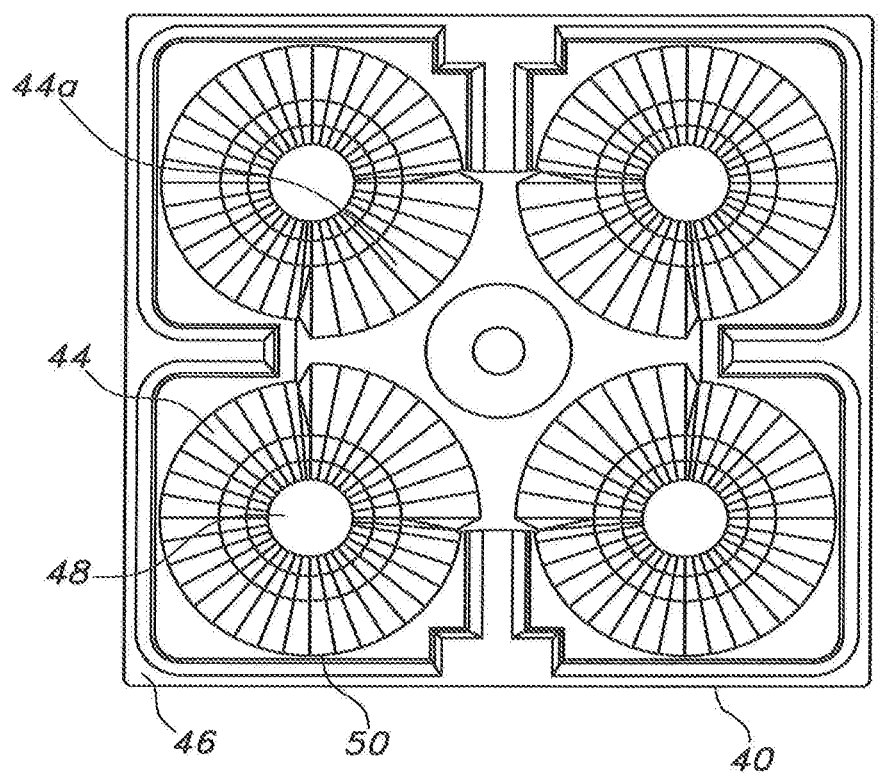
FIG. 9 is a plan view of the main reflector unit shown in FIG. 8.

The bulged portion 44a extends only 90 degrees around the circumference of the open end 50 of a respective body portion 44. As a result the open end 50 of each reflector cavity has a constant first diameter around 270 degrees of its circumference and constant second diameter, which is larger than the first diameter, around the 90 degrees defined by the bulged portion 44a, as shown in FIG. 9.

The bulged portions 44a of the reflector body portions 44 are oriented in the center of square pattern of reflectors in the common frame 46. As will he discussed in further detail below, the bulged portions 44a will be aligned with the reflector edge portions 52 of the crown reflector hub 42 when the hub is assembled to the main reflector unit 40.

In either embodiment, each main body portion 44 further defines an open end 50 opposite the vertex opening 48 and an inner reflective surface extending between the two opposite openings. The open ends 50 of the main body portions 44 define a common plane on the surface of the frame 46. Here too, the main reflector unit 40 can be molded from a plastic material and a highly reflective layer or coating is applied to at least the inner surface of the wells forming the main body portions 44 in a known manner.

The crown reflector hub 42 integrates four crown reflector portions 52 into a single unit. In particular, the crown reflector hub 42 is formed with four crown reflector portions 52, each having an arc length of 90 degrees. The four crown portions 52 face outwardly from a hub center axis 54 and are radially spaced from each other by 90 degrees with respect to the hub center axis so that the crown reflector hub 42 has a generally X shape.

Each of the four crown reflector portions 52 is similar in most respects to the single crown reflector portion 20 described above. However, instead of being a full 360 degree conical section, each of the four crown reflector portions 52 is a partial 90 degree conical section formed by a tapered wall having an inner reflective surface 56 for reflecting and directing light emitted by an LED light source out through an exit aperture, which is effectively narrowed by the crown reflector portion. Here too, the crown reflector hub 42 is molded from a plastic material and a highly reflective layer or coating is applied to at least the inner reflective surfaces 56 of the four crown reflector portions 52.

The crown reflector hub 42 is attached to the main reflector unit 40 so that each of the four crown reflector portions 52 partially covers the open end 50 of a respective main body portion 44 of the main reflector unit. In the case of main body portions 44 having radially budged portions 44a, each of the four crown reflector portions 52 fully covers the bulged portion of the open end 50 of a respective main body portion 44 of the main reflector unit.

In either case, assembly of the crown reflector hub 42 to the main reflector unit 40 is achieved by aligning the center axis 54 of the hub 42 with an axis 58 defined equidistant from the central optical axis of each main body portion 44. The hub 42 is also positioned so that the inner reflective surfaces 56 of the crown reflector portions 52 face into the wells of the main body portions 44. Attachment of the hub 42 to the main reflector unit 40 can be seen in FIGS. 11 and 12. In this manner, each main body portion 44 has a partial 90 degree crown reflector portion 52 provided at its open end 50 to direct light emitted from an LED diode positioned at an opposite opening 48 in a desired pattern.

The hub 42 can be attached to the main body unit 40 by any means. In a preferred embodiment, releasable attachment is achieved with a central bolt 58 inserted at a convenient location through a center through hole of the hub 42 and main body unit 40, which engages a threaded hole 61 in the light head housing 60 shown in FIG. 10.

Figure 10:
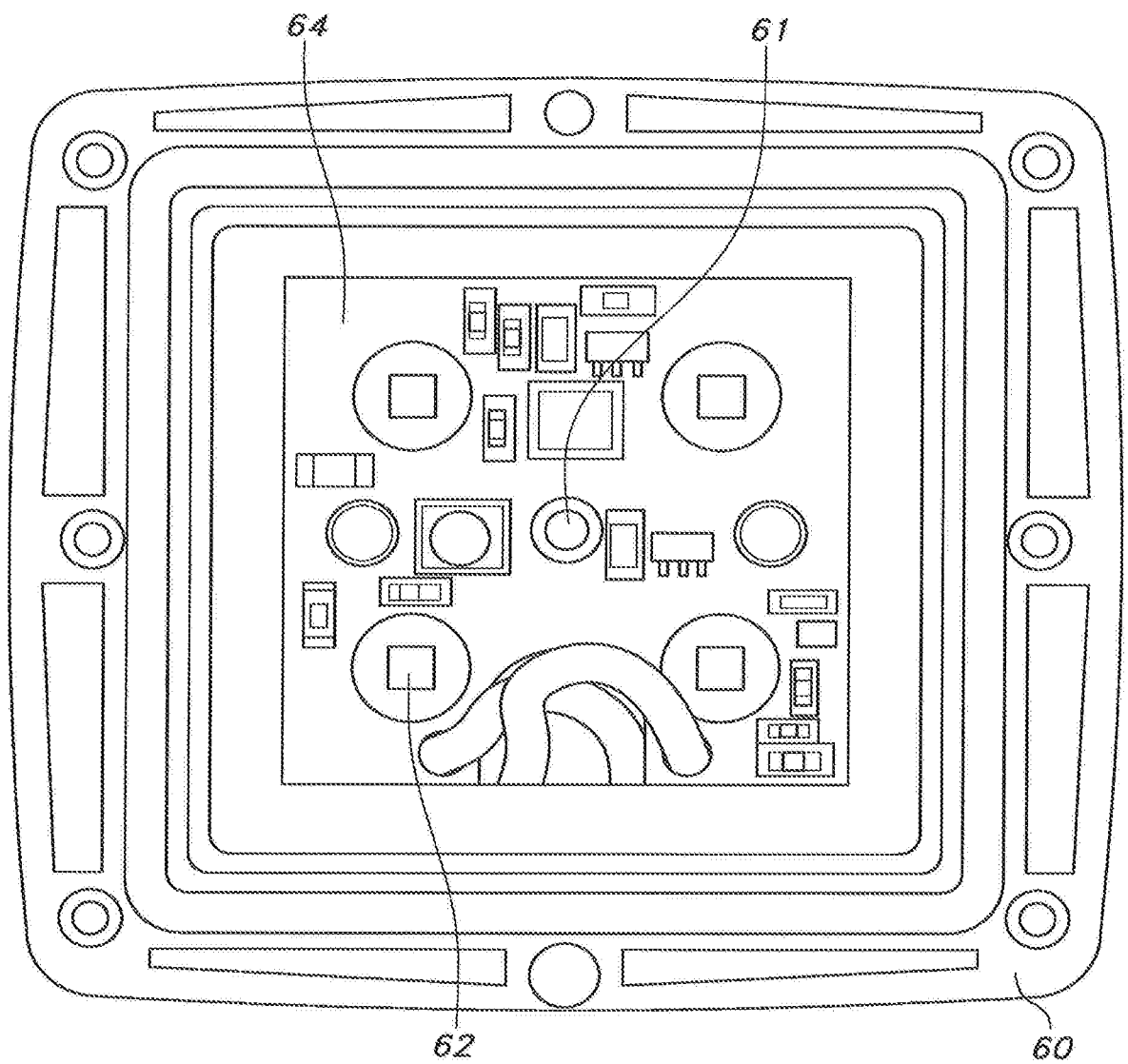
FIG. 10 is a plan view of an LED emergency lighting head housing.

Referring now to FIG. 10, the LED lighting head assembly of the present invention includes a light head housing 60, which also serves as a heat sink for the electrical components of the light head assembly. The electrical components of the light head assembly are generally conventional. Specifically, conventional LED lamp assemblies 62 are mounted on a flat printed circuit board (PCB) 64 of a generic design. The PCB 64 and associated electronics are, in turn, mounted within a recess of the housing. The construction of the complete emergency head including the metal housing 60, with possible additional heat sink components is also generic.

However, according to the present invention, four LED lamp assemblies 62 are mounted to a PCB 64 in a square pattern matching the square pattern of the main reflector unit wells 44. In this manner, when the main reflector unit 40 is inserted within the recess of the housing, each of the four LED lamp assemblies 62 is aligned and received within a respective LED opening 48 of the main reflector unit 40. As mentioned above, the housing 60 is further preferably provided with a threaded hole centrally located to receive a bolt for attachment of the reflector unit 40 and hub 42 to the housing.

Figure 11:
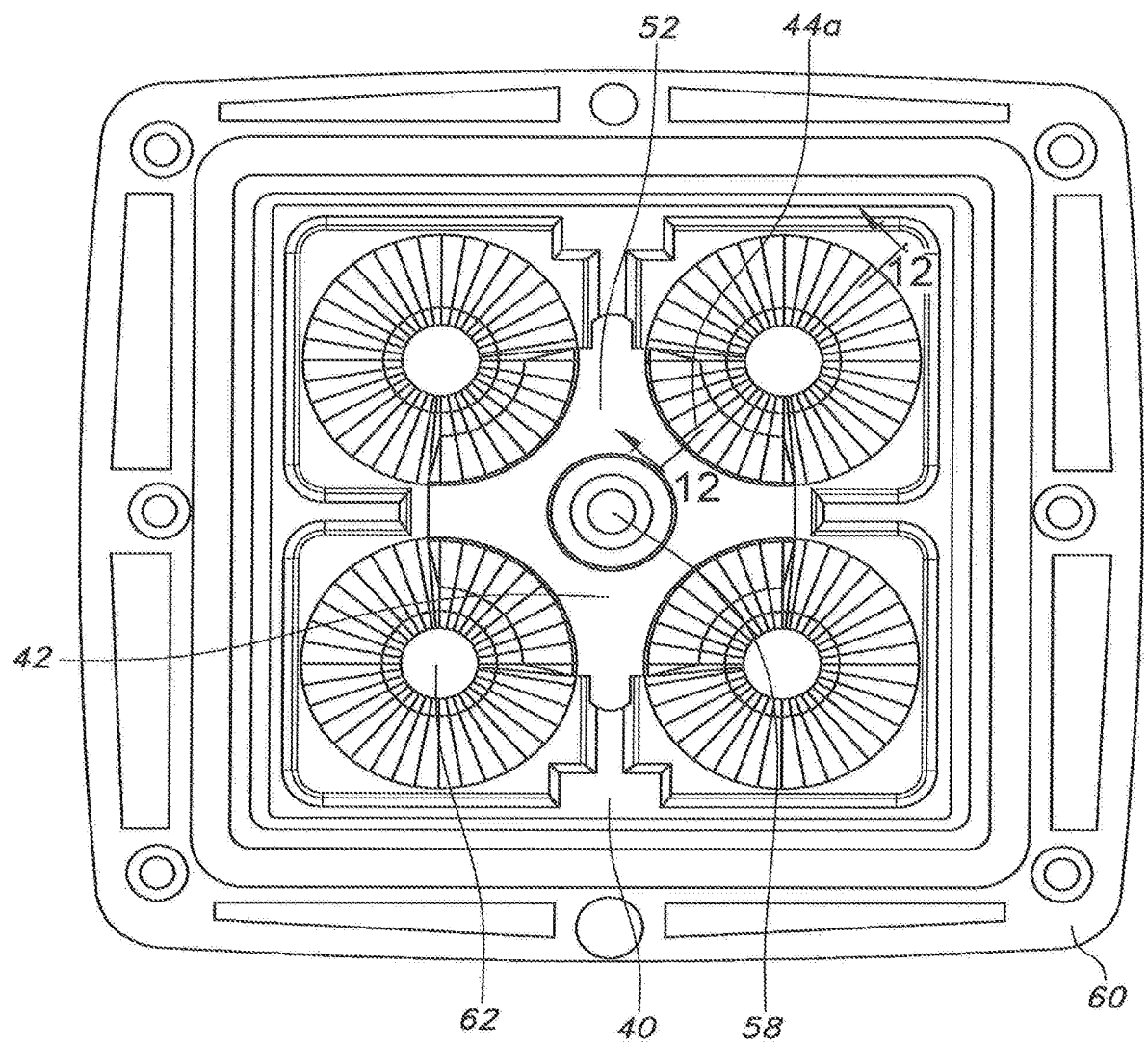
FIG. 11 is a plan view of the assembled crown reflector hub and main reflector unit shown in FIG. 8 attached to the LED emergency lighting head housing shown in FIG. 9.

FIG. 11 shows the main reflector unit 40 and the crown reflector hub 42 centrally mounted to the housing 60. As can be seen in FIG. 11, the reflector portions 52 of the crown reflector hub 42 cover the bulged portions 44a of the main reflector body 44 so as to form a light exit aperture in the shape of a full circle with a constant diameter, when viewed from directly below the reflector. However, as shown in the cross-sectional view of FIG. 12, the conic surface under the crown has a larger base (wide angle) compared to the rest of reflector. The purpose of the bulged portion 44a is to increase the luminous flux coming directly from the LED to the crown reflector, to be spilled sideways. In other words, the bulge portion 44a captures more light to be reflected by the crown reflector portion 52.

Thus, an emergency LED light head assembly, as part of a luminaire for emergency lighting, is formed. The light head assembly includes four LED lamps, a flat-shape printed circuit hoard (PCB) and a two-piece reflector kit. The four LED lamps are soldered and interconnected on the PCB. The PCB may also contain other electronic components as part of a power supply (LED driver). The two reflectors are fixed together with a screw along the radial axis and sit tight on the PCB surface, around the LEDs.

The reflector kit is composed of a primary (main) reflector and of a secondary reflector with the shape of a crown (crown). The main reflector has four identical cavities. Each LED is centered inside a cavity. The cavities have the shape of a cone with the cone section being a degenerated parabola. The cavity shape will create the beam angle of the luminaire, for example in the range of 10-30 degrees. The crown reflector is designed to spill part of the light sideways (e.g., 45-90 degrees) from the reflector main axis.

The envelope of each cavity is partitioned in two surfaces, with radial angles of 90 degrees and 270 degrees respectively. The 90-degree area has a slightly larger axial angle than the rest of cavity. The crown reflector has the reflective surface aligned over the 90-degree cavity area of main reflector.

It can be appreciated by one skilled in the art that other numbers of LED lamps can be used in the present invention with a reflector unit having a corresponding number of wells. It is also possible to utilize crown reflector portions having are lengths other than 90 degrees. In this regard, the size of the radial angle will determine the amount of luminous flux being deviated. For example, an angle of 180 degrees will double the luminous flux diverted sideways, compared with the angle of 90 degrees described above with respect to the preferred embodiment of the invention.

It should be apparent to those skilled in the art that the described embodiments of the present invention provided herein are illustrative only and not limiting, having been presented by way of example only. As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. While various embodiments of the present invention are specifically illustrated and/or described herein, it will be appreciated that modifications and variations of the present invention may be effected by those skilled in the art without departing from the spirit and intended scope of the invention.

All documents, patents and other literature referred to herein are incorporated by reference in their entirety.

The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims. For example, the cable tie may be embossed or printed with indicia and still be included in the meaning of "consisting essentially of", even if not specifically recited. The term "consisting of" as may be used in the following claims is intended to indicate that the claims are restricted to the recited elements.

It should be noted that it is envisioned that any feature, element or limitation that is positively identified in this document may also be specifically excluded as a feature, element or limitation of an embodiment of the present invention.

What is claimed is:

1. An emergency lighting head comprising an LED light source and a reflector, wherein the reflector comprises:
    a main body reflector portion having an inner reflective surface, the inner reflective surface being symmetrical about a central optical axis along a length of the main body portion, the main body portion having a first end for receiving the LED light source and a second end opposite the first end; and
    a crown reflector portion attached to the second end of the main body reflector portion, the crown reflector portion having an inner reflective surface tilted inwardly from the second end of the main body reflector portion toward the central optical axis,
    wherein the second end of the main body portion creates a beam angle for light emitted from the LED light source with respect to the central optical axis and the crown reflector portion reflects the light exiting the second end of the main body portion at an angle with respect to the central optical axis that is greater than the beam angle.

2. The emergency lighting head as defined in claim 1, wherein the length of the symmetrical inner reflective surface extends between the first end of the main body reflector portion and the second end of the main body reflector portion.

3. The emergency lighting head as defined in claim 1, wherein the main body reflector portion has a parabolic shape defined by a vertex disposed on the central optical axis, the LED light source being positioned adjacent the vertex.

4. The emergency lighting head as defined in claim 1, wherein the crown reflector portion extends 360° around the second end of the main body reflector portion.

5. The emergency lighting head as defined in claim 1, wherein the crown reflector portion extends only partially around the second end of the main body portion.

6. The emergency lighting head as defined in claim 1, wherein the beam angle is between 10-30 degrees with respect to the central optical axis and the angle is 45-90 degrees with respect to the central optical axis.

7. The emergency lighting head as defined in claim 1, wherein the length of the symmetrical inner reflective surface extends along an upper portion of the main body reflector portion beginning at the first end of the main body reflector portion, and the main body reflector portion has a lower portion adjacent the second end of the main body reflector portion, the lower portion having a bulged portion defined by a radius greater than a maximum radius of the upper portion.

8. The emergency lighting head as defined in claim 7, wherein the bulged portion extends upper portion extends only partially around the second end of the main body portion in a circumferential direction.

9. A reflector for an LED emergency lighting head comprising:
a main reflector unit having a plurality of wells formed therein, each well having an inner reflective surface symmetrical about a central optical axis along a length of the well, the well having a first end for receiving an LED light source and a second end opposite the first end; and
a crown reflector hub disposed between at least two adjacent wells of the main reflector unit, the crown reflector hub having at least one inner reflective surface tilted inwardly from the second end of one of the at least two adjacent wells toward the central optical axis of the one of the at least two adjacent wells,
wherein each of the second ends of the wells of the wells creates a beam angle for light emitted from an LED light source disposed at the first end of between 10-30 degrees with respect to the central optical axis and each of the inner reflective surfaces of the crown reflector hub reflects light exiting the second end of the respective well reflective surface at an angle of 45-90 degrees with respect to the central optical axis.

10. The reflector as defined in claim 9, wherein the length of the symmetrical inner reflective surface extends between the first end of the well and the second end of the well.

11. The reflector as defined in claim 9, wherein the main reflector unit comprises four adjacent wells arranged in a square pattern and the crown reflector hub comprises an inner reflective surface for each of the four adjacent wells.

12. A reflector as defined in claim 9, wherein each of the inner reflective surface of the main reflector unit has a parabolic shape defined by a vertex disposed on the respective central optical axis adjacent the first end.

13. A reflector for an LED emergency lighting head comprising:
a main reflector unit having a plurality of wells formed therein, each well having an inner reflective surface symmetrical about a central optical axis along a length of the well, the well having a first end for receiving an LED light source and a second end opposite the first end; and
a crown reflector hub disposed between at least two adjacent wells of the main reflector unit, the crown reflector hub having at least one inner reflective surface tilted inwardly from the second end of one of the at least two adjacent wells toward the central optical axis of the one of the at least two adjacent wells,
wherein the main reflector unit comprises four adjacent wells arranged in a square pattern and the crown reflector hub comprises an inner reflective surface for each of the four adjacent wells and each of the inner reflective surfaces of the crown reflector hub extends only partially around the second end of a respective well.

14. The reflector as defined in claim 13, wherein each of the inner reflective surfaces of the crown reflector hub extends 90 degrees around the second end of a respective well.

15. The reflector as defined in claim 9, wherein the length of the symmetrical inner reflective surface extends along an upper portion of the well beginning at the first end of the well, and the well has a lower portion adjacent the second end of the well, the lower portion having a bulged portion defined by a radius greater than a maximum radius of the upper portion.

16. The reflector as defined in claim 15, wherein the bulged portion extends upper portion extends only partially around the second end of the well in a circumferential direction.

* * * * *